3,214,424
DISAZO DISPERSE DYESTUFF
Eiji Koike and Fujio Kanazawa, Toyonaka-shi, Japan, assignors to Sumitomo Chemical Company, Ltd., and Toyo Spinning Co., Ltd., both of Osaka, Japan, both corporations of Japan
No Drawing. Filed Aug. 16, 1963, Ser. No. 302,734
Claims priority, application Japan, Sept. 24, 1962, 37/41,814
1 Claim. (Cl. 260—187)

The present invention relates to a new disazo disperse dyestuff having the formula,

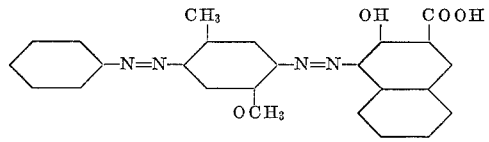

and a method for producing the same.

An object of the present invention is to provide a new disazo disperse dyestuff which has excellent dyeability to fibers, films and the like shaped articles, particularly to synthetic fibers, containing polyolefine such as polyethylene and polypropylene. Another object is to provide a method for producing the disazo disperse dyestuff as mentioned above. Still another object is to provide a method of dyeing synthetic fibers, films and the like shaped articles, containing polyolefine such as polyethylene and polypropylene with high fastnesses to light, organic solvents, sublimation and washing. Further object is to provide synthetic fibers, films and the like shaped articles containing polyolefine such as polyethylene and polypropylene which are dyed with the dyestuff as mentioned above. Other objects would be apparent from the following description.

The disazo disperse dyestuff according to the invention may be produced by coupling diazotized 4-amino-3-methoxy-6-methyl-1,1'-azobenzene (the diazo component) with 2-hydroxynaphthalene-3-carboxylic acid (the azo component).

The diazo component, 4-amino-3-methoxy-6-methyl-1,1'-azobenzene may be produced by coupling diazotized aniline with 2-methoxy-5-methylaniline (cresidine).

The procedure for diazotization and coupling in the method of the invention and in the production of the diazo component would be obvious to those skilled in the art.

The disazo dyestuff according to the present invention can be used for dyeing fibers (in the form of thread, yarn and woven and knitted fabrics and textiles), films and other shaped articles, containing polyolefines, for example, polyethylene and polypropylene under a dispersing condition in an aqueous medium according to the conventional procedures, with high exhaustion and fastnesses. If desired, the present disazo dyestuff may be formed by effecting the diazotization and coupling on a fiber, fabric or textile, as in the conventional procedure.

The characteristic of the dyestuff according to the present invention from the viewpoint of the chemical structure, is considered to be in a combination of one methoxy and one methyl radicals present at specific positions in the diazo component, with a hydroxy radical present at the ortho position to the azo group originated from the azo component and a carboxy radical adjacent to the hydroxy radical. The present dyestuff has extremely superior properties, besides its specific color tone, when compared with the other dyestuffs produced using, as the diazo component, 4-amino-1,1'-azobenzene per se, i.e. that having no substituent, and various other 4-amino-1,1'-azobenzene derivatives having one or more non-dissociative substituents such as methyl, methoxy, halogen and nitro substituents at other positions. In other words, the present dyestuff exhibits excellent exhaustion and high fastnesses to light, organic solvents and sublimation, on polyolefine articles, when compared with the heretofore known dyestuffs having analogous structure. If 2-hydroxynaphthalene having no carboxy radical is used as the azo component with the present diazo component, the dyestuff obtained is too oleo-soluble and has an inferior fastness to sublimation. Contrariwise, 2-hydroxynaphthalene-3-carboxylic acid as the azo component endows the dyestuff with an adequate degree of inorganic properties without sacrifice of affinity to polyolefine articles. Thus, the characteristic of the present dyestuff comprises the fact that the specificity in the diazo component is combined with that in the azo component.

The disazo dyestuff according to the present invention may be used in particles finely divided by a suitable means, more preferably, as a mixture of such particles with an agent such as alkylnaphthalenesulfonic acid-formaldehyde condensate. Dyeing of polyolefine articles is effected, as in the ordinary disperse dyestuffs, in the form of an aqueous dispersion or suspension at a bath temperature of 80° to 120° C., in the presence of an anionic or nonionic surface active agent as the case may be.

The following examples are given in order to illustrate the invention and not to limit the invention, and, in the examples, parts and percent are described in the meanings by weight unless otherwise identified.

Example 1

To 250 parts of water, 24.1 parts of 4-amino-3-methoxy-6-methyl-1,1'-azobenzene and 30 parts of 35% hydrochloric acid are added, and the mixture is stirred. Then 7 parts of sodium nitrite dissolved in 20 parts of water is added under stirring thereto.

The diazotization reaction is carried out under stirring for 2 hours at 15–20° C. On the other hand, a solution of 18.8 parts of 2-hydroxynaphthalene-3-carboxylic acid, 6 parts of sodium hydroxide and 8 parts of sodium carbonate, dissolved in 150 parts of water, is cooled by adding 100 parts of ice. The solution of the diazotized monoazo-amino compound prepared as above is added dropwise at below 5° C. thereto, and the stirring is continued for 2 hours.

The reaction mixture is filtered and the separated solid dyestuff is washed with water and dried.

The dyestuff obtained as dark brown powder, weighs 40 parts and is represented by the following formula.

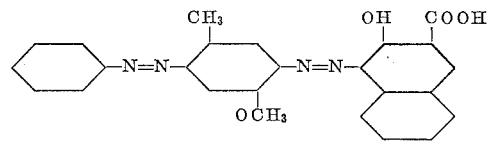

Example 2

Two parts of the dyestuff prepared in the Example 1 is finely divided and added to an aqueous solution of 3 parts of sodium oleyl sulfate dissolved in 8,000 parts of water.

Into the dispersion of the dyestuff, 200 parts of a fabric made of polyolefine fiber, is dipped and the temperature is raised slowly up to 80°–120° C., and the fabric is dyed at this temperature for 1 hour.

Then, the fabric is washed with 10,000 parts of a 0.2% aqueous sodium alkylbenzenesulfonate solution at 95° C. for 10 minutes, then washed with water and dried.

In this way, the polyolefine fiber can be dyed in bluish grey color with high fastnesses to light, washing, sublimation and organic solvents.

What we claim is:
A disazo disperse dyestuff having the formula,
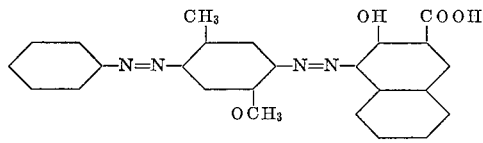
References Cited by the Examiner
UNITED STATES PATENTS
| | | | |
|---|---|---|---|
| 1,557,265 | 10/25 | Miller | 260—187 |
| 2,420,630 | 5/47 | Taylor | 260—187 |
| 3,098,847 | 7/63 | Gaetani | 260—187 |
| 3,158,435 | 11/64 | Gaetani et al. | 8—41 |
| 3,160,467 | 12/64 | Sureau et al. | 8—41 |
CHARLES B. PARKER, *Primary Examiner.*